United States Patent

[11] 3,587,534

| [72] | Inventor | Wolfgang Weichelt<br>Zwickau, Germany |
|---|---|---|
| [21] | Appl. No. | 824,238 |
| [22] | Filed | May 13, 1969 |
| [45] | Patented | June 28, 1971 |
| [73] | Assignee | Veb Sachsenring Automobilwerke Zwickau<br>Schliessfach<br>Zwickau, Germany |

[54] SUCTION SYSTEM FOR ROTARY PISTON INTERNAL COMBUSTION ENGINES
11 Claims, 3 Drawing Figs.

[52] U.S. Cl.................................................. 123/8.13,
123/119, 418/61
[51] Int. Cl........................................................ F02b 53/06
[50] Field of Search.......................................... 123/8, 8
(JJ); 123/8 (GOK), 119, 8.13; 418/61

[56] References Cited
UNITED STATES PATENTS

| 3,168,077 | 2/1965 | Froede | 123/8(JJ) |
| 3,244,153 | 4/1966 | Froede | 123/8(JJ) |
| 3,347,213 | 10/1967 | Froede | 123/8(JJ) |
| 3,412,716 | 11/1968 | Tausch et al. | 123/8(JJ) |
| 3,424,136 | 1/1969 | Hamada | 123/8(JJ) |
| 3,456,623 | 7/1969 | Weigert et al. | 123/8(JJ) |
| 3,485,219 | 12/1969 | Hamada et al. | 123/8(JJ) |

*Primary Examiner*—Allan D. Herrmann
*Attorney*—Nolte and Nolte

ABSTRACT: A rotary type internal combustion engine of trochoidal configuration, including a single-stage carburetor, an auxiliary shutoff device in the induction passage anterior to the inlet port and a supplementary suction system disposed on the exterior of the body forming the induction passage, and coaligned with the shutoff device therein. The suction system includes an idle fuel passage, and means for regulation the amount of the fuel-air mixture introduced into the inlet port in order to achieve the smooth operation of the engine during idling and at variable loads.

3,587,534

SUCTION SYSTEM FOR ROTARY PISTON INTERNAL COMBUSTION ENGINES

BACKGROUND OF THE INVENTION

The present invention relates to a suction system for rotary type internal combustion engines, preferably of trochoidal configurations, and more particularly to engines comprising a single stage carburetor and an auxiliary shutoff device in the induction passage anterior to the inlet port.

Conventional internal combustion engines with reciprocating pistons generally use a single-stage carburetor. In order to achieve an improved composition of the combustion mixture, rotary-type internal combustion engines employ almost exclusively, multistage carburetors. In engines of the latter type, wherein the inlet port admitting the mixture into the engine is alternately covered and exposed by the peripheral edges of the rotating piston, communication between the inlet port and the outlet port is unavoidable at a predetermined rotational angle of the piston, so that the sucked-in mixture is diluted by the exhaust gases.

The dilution results in a rough engine performance not only during idling but also when the engine is under partial load as when the car is accelerating which results from this dilution. The unevenness is felt as undesirable jolting.

A number of improvements have been suggested by the prior art to eliminate the shortcomings of the conventional devices. One system adds to the rotary type internal combustion engine a supplementary idle fuel passage, with a control port formed posteriorly of the main inlet port in the rotational direction of the piston. Such a system requires, however, a special carburetor and has the additional drawback that the exhaust gases in the induction manifold, between the inlet port and the throttle valve of the carburetor, are combined with the sucked-in mixture during the transition from idling to partial load operation which leads to misfiring of the engine. An arrangement of this type also needs an elaborate construction of the induction manifold or passage of the required length since the supplementary idle fuel passage must be included.

Another system provides for an additional channel for partial load operation through which the fuel-air mixture is supplied by the first stage of a register carburetor; the main induction passage is connected to the second stage of the multistage carburetor and remains closed, up to a 30 percent load, by a throttle valve disposed anteriorly of the inlet port. A multistage carburetor of this type improves the engine performance during idling and at partial loads. However, when a vehicle is in drive with the throttle valve closed, a large quantity of exhaust gases are admitted into the engine during the suction process, so that the vehicle becomes subject to shaking due to misfiring of the engine.

In yet another prior art solution, the fuel-air mixture for partial load operation of the engine is supplied by an auxiliary carburetor flanged to the housing, and transmitted to the engine through a secondary induction passage. In this construction, the main carburetor is spaced at a distance from the engine, respectively the inlet port thereto, because of the vibrations of the gas head. This solution, though advantageous, is very expensive since it requires two carburetors, a complicated air filter system, and a precise coordination of the two carburetors which is difficult to achieve.

SUMMARY OF THE INVENTION

It is, therefore, an object of the present invention to eliminate the drawbacks of prior art rotary engines and to provide a simple and compact suction system for a rotary type internal combustion engine of trochoidal configuration.

Another object is to provide this suction system in an engine comprising a single-stage carburetor and one induction passage.

Yet another object is to provide a uniform combustion mixture for idling, for the transition phase between idling and partial load operation, and for a vehicle while cruising so as to eliminate misfiring.

These objects and others which will become apparent hereinafter, are attained in accordance with the present invention, by adding to a rotary type internal combustion engine with an auxiliary shutoff device in the induction passage anteriorly of the inlet port leasing into the engine, a supplementary suction system disposed at the exterior of that portion of the body forming the induction passage which contains, in its interior, the shutoff device. In one preferred embodiment of the invention, the shutoff device and the supplementary suction system are housed in an adapter flange attached to the engine housing. In another preferred embodiment both the shutoff device and the suction system are enclosed in the wall of the housing itself. The suction system includes an idle fuel passage and means for controlling the amount of the fuel-air mixture passing from the idle fuel passage into the engine. Optionally, an air intake vent communicates with this passage and means are provided for adjusting the opening of this vent. A stop means juxtaposed with the shutoff device in the induction passage on the engine side thereof is part of the suction system.

Common actuation of a throttle valve journaled to the body of the induction passage proximate to the carburetor, and of the shutoff device journaled to that body proximate to the engine inlet port may result in minor differences in the cross section of the passage. The shutoff device may be formed as a conventional throttle valve, a rotary slide valve, or a gate-type slide valve.

The supplementary suction system, according to the invention permits a more precise adjustment of the mixture during idling; the stop means in the main induction passage blocks transmission of fuel when the throttle valve and the shutoff device are closed. The fuel, attached as a capillary film to the walls of the induction passage, is drawn into the idle fuel passage where it may be mixed with auxiliary air admitted through an air vent. Thus, a rich fuel-air mixture is available for the transmission phase between idling and partial load operation since the suction system is open even when the shutoff device is in a closed position, preventing the admission of exhaust gases into the induction passage and a dilution of the sucked-in mixture.

When a vehicle is cruising at a very low pressure, the engine draws from the supplementary suction system a uniform fuel-air mixture, so that the vehicle is not exposed to unsmooth vibrations due to misfiring of the engine.

The above and other objects, features and advantages of the present invention will become more readily apparent from the following.

DESCRIPTION OF THE PREFERRED EMBODIMENTS

Figure 1:
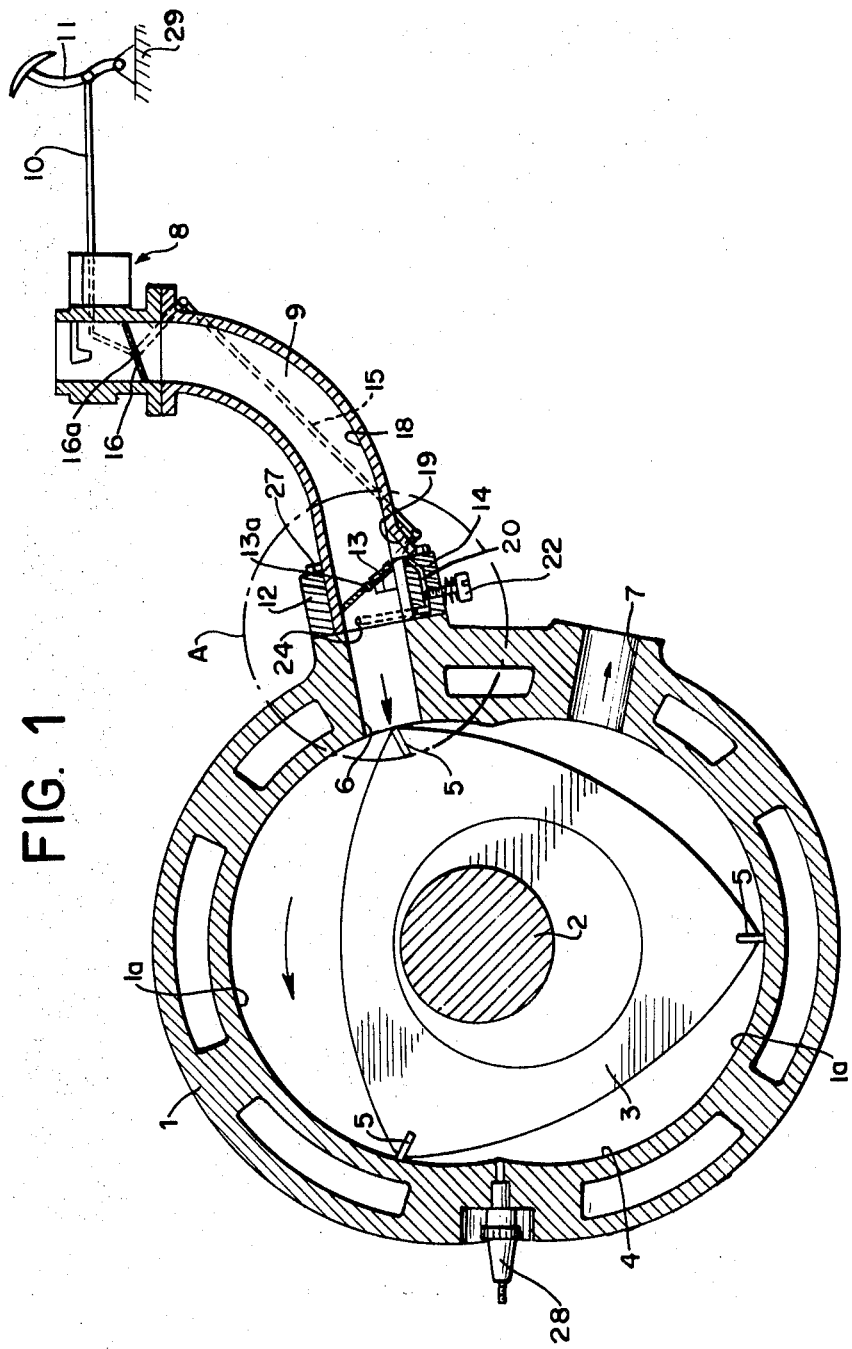
FIG. 1 is a longitudinal sectional view of a rotary type internal combustion engine according to the present invention; the plane of FIG. 1 being taken normal to the axis of the mainshaft and centrally through the engine housing midway between the opposed sides thereof.
Figure 2:
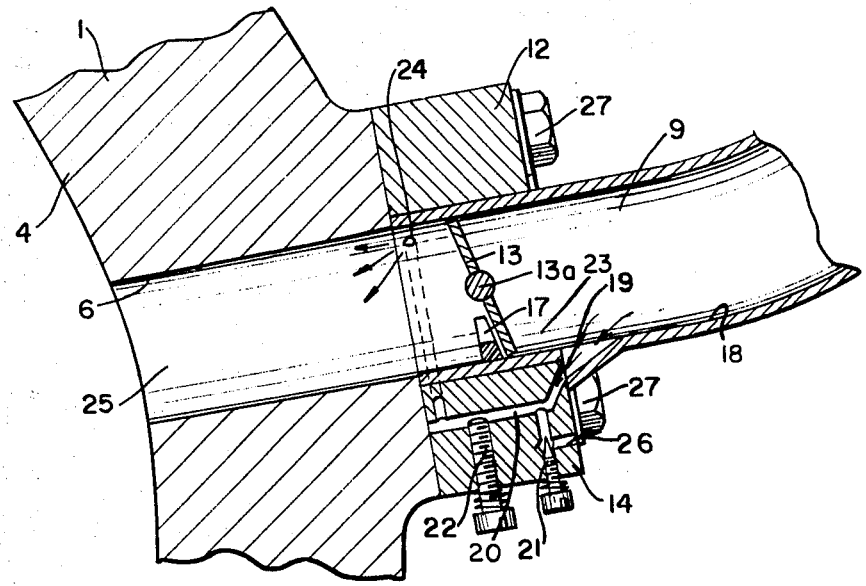
FIG. 2 shows at an enlarged scale the detail A enclosed within the dot-dash line circle of FIG. 1, with an additional air intake vent communicating with the idle passage and regulating means for said intake vent.

In the drawings there is shown in FIG. 1 the housing 1 of a rotary type internal combustion engine comprising two end plates (not shown), formed with a central opening (not shown) through which an eccentric shaft 2 extends. A polygonal piston 3 mounted on shaft 2 is adapted to rotate along the approximately trochoidal inner wall surface 1a of the housing 1. A plurality of sealing strips 5 are radially disposed on the periphery of the piston 3. An inlet port 6 communicating with the induction manifold or passage 9 and an exhaust port 7 are formed in the housing 1. Reference number 28 indicates the spark plug. A single stage carburetor 8 of conventional design, spaced at a distance from the housing 1, is flanged to one end of the body forming the induction passage 9 and delivers the fuel-air mixture required for operation of the engine. A throttle valve 16 rotatably mounted on a throttle shaft 16a secured in the induction passage 9 downstream of the carburetor 8 is actuatable, via the linkage 10, by a foot pedal 11 pivotably mounted on a base 29. A shutoff device 13 which may be formed as a valve of conventional type and which in the embodiment of FIGS. 1 and 2 is a throttle valve is secured on a shaft 13a in the induction passage 9, downstream of the throttle valve 16 and anteriorly of the inlet port 6. Stop means 17 (shown more clearly in FIG. 2) are attached to the wall of the induction passage 9 on the side of the inlet port 6, proximate to the shutoff device 13, and are formed as a wedge extending perpendicularly to the longitudinal axis of the induction passage. The shutoff device 13 is linked by a connecting rod 15 with the throttle valve 16 and is jointly actuatable therewith by the depression or release of the foot pedal 11. A suction system 14, including an idle fuel passage 20, and a regulating device 22 for controlling the amount of the fuel-air mixture passing through the passage 20 and discharged into the engine is formed, in accordance with the preferred embodiments shown in FIGS. 1 and 2 on the outside of that portion of the body of the induction passage 9 to which the shutoff device 13 is secured in the interior thereof. An adapter flange 12 attached to the housing 1 by threaded means 27 encloses both the respective portions of the induction passage 9 and the suction system 14 formed on the outside of that portion. The idle fuel passage 20 comprises an inlet 19 upstream of the shutoff device 13 and communicates downstream of the shutoff device 13 at passage 23 which terminates at port 24, where the mixture is discharged into portion 25 of the induction passage 9, and therefrom, through the inlet port 6 into the engine. The diameter of the passages in the suction system is sufficiently smaller than the diameter of the induction passage 9 that the fuel flow in the suction system is a velocity sufficient to prevent the flow of exhaust gases into the suction system. This, of course, is the condition obtaining when the throttle valve and auxiliary shuttoff means are in a substantially closed condition, such condition in itself obviously assuring that significant flow of exhaust gases into the induction passage past the auxiliary shutoff means does not occur. At more open throttle conditions, the problem of dilution of the fuel-air mixture by exhaust gases does not occur at all, as is well known in the prior art.

In the preferred embodiment shown in FIG. 2, an additional air intake vent 26 is established in the adapter flange 12 which communicates with the idle passage 20. An adjusting device 21 controls the size of the air intake vent opening and thereby regulates the air flow into the idle passage.

Figure 3:
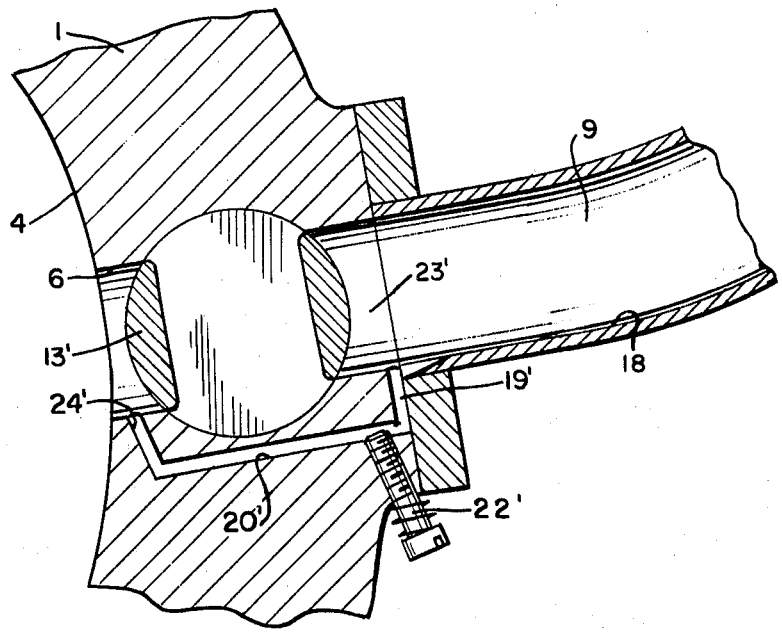
FIG. 3 shows at an enlarged scale in a view similar to that of FIG. 2, an alternate embodiment of the present invention.

According to the view shown in FIG. 3, the portion 23 of the induction passage 9, including the shutoff device 13' and the idle fuel passage 20' together with the regulating device 22' are formed in the housing 1 anterior to the inlet port 6. Both the inlet 19' and the outlet port 24' of the passage 20' communicates directly with the induction passage 9, specifically with the portion 25 thereof, on opposite sides of the shutoff device 13'. In the embodiment according to FIG. 3, and air intake vent 26 communicating with the passage 20 is omitted. Shutoff device 13' is a rotary slide valve of the type disclosed in U.S. Pat. No. 3,347,213 (see, in particular, FIGS. 1 and 2 and col. 3, 11. 30—46 of that patent).

In operation, the fuel-air mixture formed in the carburetor 8 is drawn into the engine by the rotary motion of the piston 3, alternately covering and uncovering the inlet port 6 and the outlet port 7. The flow of the mixture from the carburetor 8, through the induction passage 9, and the inlet port 6 is controlled by a throttle valve 16 disposed in the passage 9 proximate to carburetor 8 and an auxiliary shutoff device 13 disposed in the passage 9 anteriorly to the inlet port 6. The valve 16 and the shutoff device 13 are jointly operable by the foot pedal 11 to which they are connected by linking rods 15 and 10. During idling, both valve 16 and the shutoff device 13 remain closed; the film formed by the fuel on the interior of the wall 18 of the induction passage 9 is blocked from passing through the induction passage by the stop means 17, bypassed through the inlet 19 into the idle fuel passage 20, mixed, if desired, with auxiliary air drawn in through the vent 26 and swirled into the portion 25 of the induction passage 9. At low engine speed or under partial-load condition of the engine the shutoff device 13 is partially opened. Thus, the fuel film passes over the stop means 17 by being detached from the latter and drawn to the sucked-in fuel-air mixture. The tight seal provided by the combined shutoff 13 device and the stop means 17 prevents a return of the exhaust gases into the induction passage 9 and prevents a dilution of the sucked-in fuel-air mixture. Thus, both for idling and for the transition phase between idling and partial load a mixture of the desired richness is available to provide for the smooth performance of the engine. Dilution of the mixture with exhaust gases is prevented, so that misfiring of the engine is avoided, and the drawbacks of conventional suction systems are obviated.

The invention described and illustrated is believed to admit of many modifications within the ability of persons skilled in the art, all such modifications being considered within the spirit and scope of the appended claims.

I claim:

1. In a rotary type internal combustion engine comprising a housing having an inner wall, said inner wall being of approximately trochoidal configuration and having only one inlet port and an outlet port communicating with the exterior of said housing, a single-stage carburetor spaced from said housing, an induction passage connecting said carburetor and said inlet port, a throttle valve positioned in said induction passage proximate to said carburetor, auxiliary shut-off means positioned in said induction passage at a downstream location thereof proximate to said inlet port, means operatively connected with said throttle valve and said auxiliary shutoff means for jointly moving said throttle valve and said auxiliary shutoff means between an open and a closed position, and a suction system comprising an idle fuel passage communicating between a point in the induction passage upstream of said shutoff means and a point in the induction passage downstream of said shutoff means, the idle fuel passage being of diameter diameter sufficiently smaller than that of the induction passage that when said throttle valve and said shutoff means are in a substantially closed condition the velocity of the flow of fuel through the idle fuel passage is sufficient to prevent the entry of exhaust gases thereinto.

2. The rotary engine according to claim 1, further comprising a flange on the surface of said housing, means for attaching said flange to said housing, said flange surrounding a portion of said induction passage anterior to said inlet port and said flange having formed therein said idle fuel passage.

3. The rotary engine according to claim 1, wherein a portion of said induction passage anterior to said inlet port, and said suction system disposed parallel to said portion are housed in the wall of said housing.

4. The rotary engine according to claim 1, wherein said shutoff means is a throttle valve.

5. The rotary engine according to claim 1, wherein said shutoff means is a rotary slide valve.

6. The rotary engine according to claim 1, wherein said means operatively connecting said throttle valve and said shutoff means include a foot-pedal and a plurality of rods linking said foot-pedal and said throttle valve and shutoff means.

7. The rotary engine according to claim 1, wherein said suction system comprises a fuel passage normal to the direction of flow in said induction passage, said fuel passage having an inlet communicating with said outlet of said idle fuel passage, and an outlet communicating with said induction passage at a location proximate to said inlet port.

8. The rotary engine according to claim 1, wherein said suction system comprises means for admitting auxiliary air into said idle fuel passage, means for regulating the amount of air admitted, and means for regulating the amount of the fuel-air mixture in said idle fuel passage.

9. The rotary engine according to claim 8, wherein said means for regulating the amount of air admitted into said idle fuel passage is a needle valve.

10. The rotary engine according to claim 1, further comprising stop means in said induction passage attached to a wall thereof downstream of, and juxtaposed with said shutoff device, and extending from said wall into the interior of said induction passage perpendicularly to the longitudinal axis thereof.

11. The rotary engine according to claim 10, wherein said stop means is formed as a wedge.